INVENTOR
FERNANDO DA SILVA VALERIO

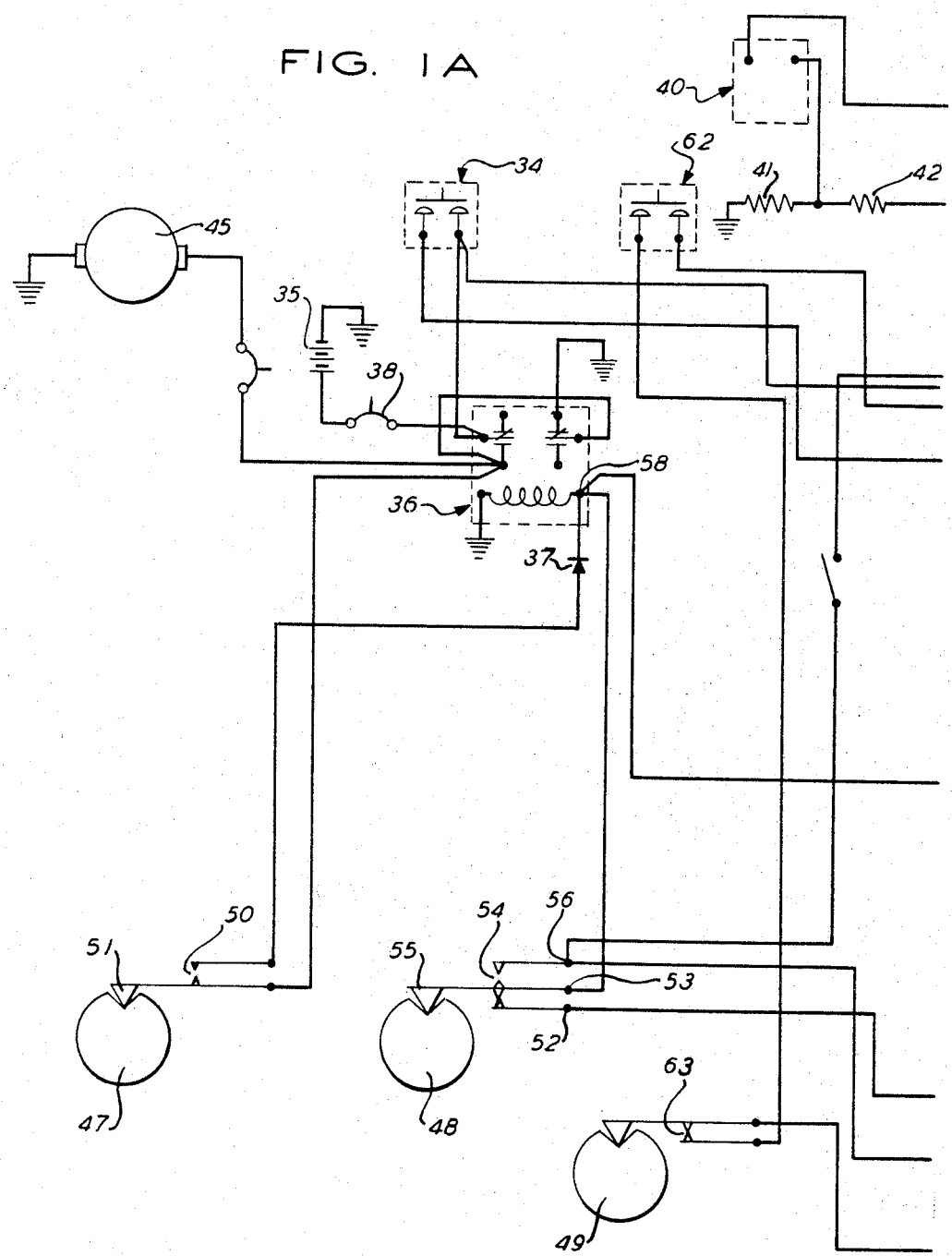

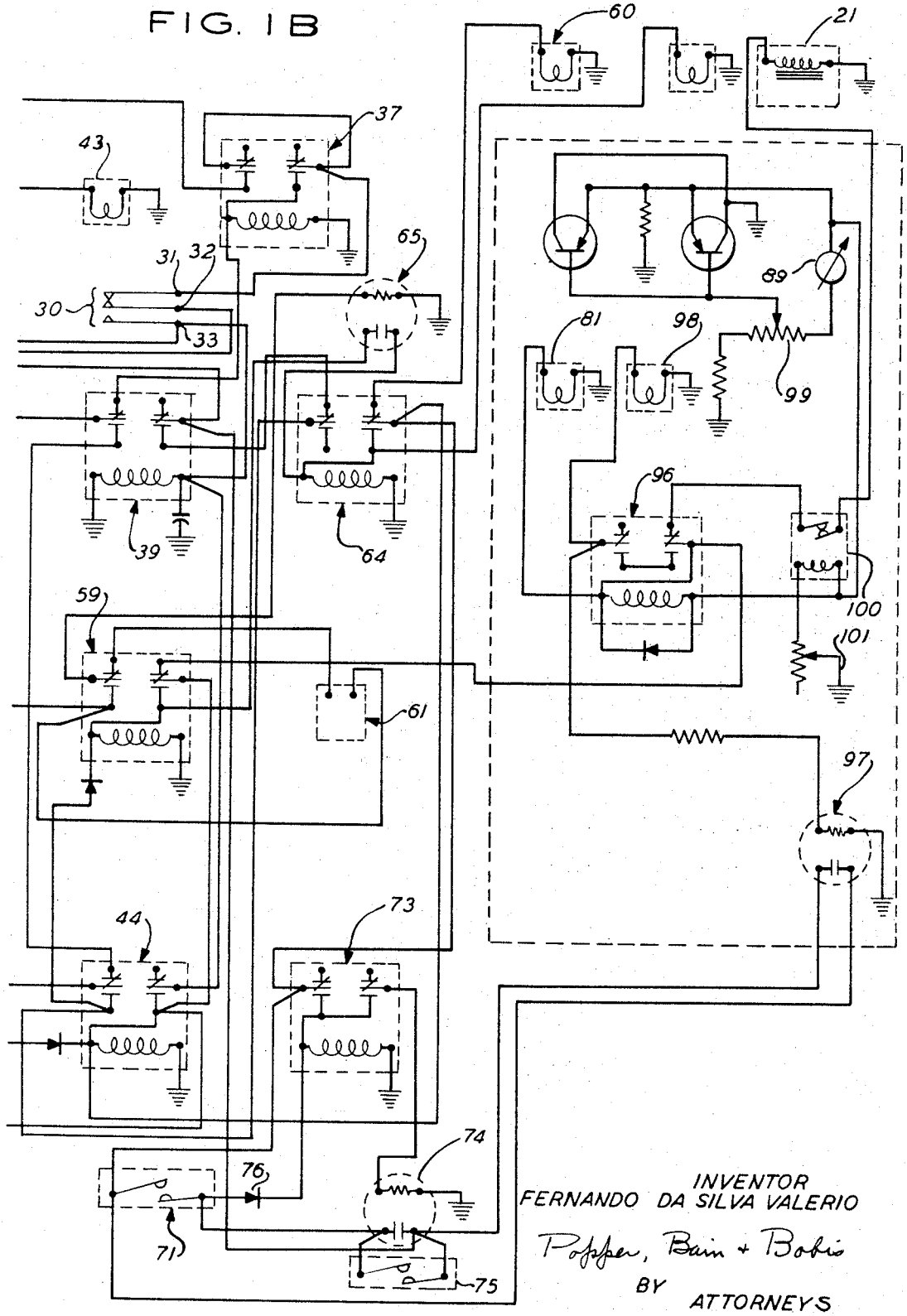

Popper, Bain + Bobis
BY ATTORNEYS

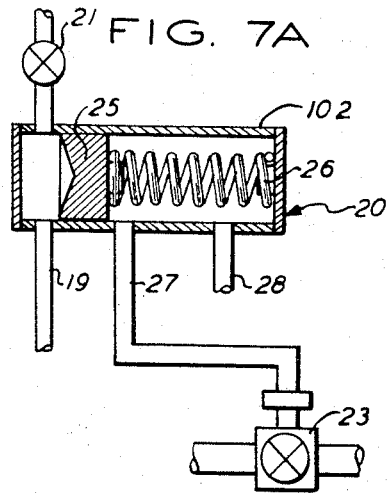
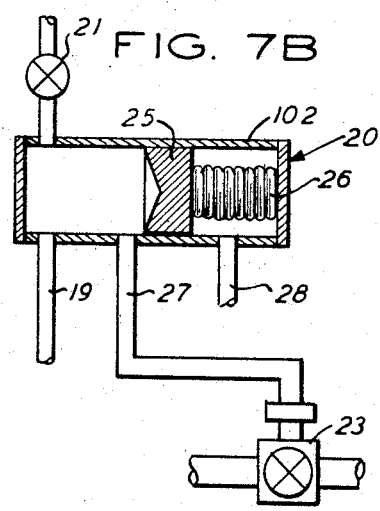
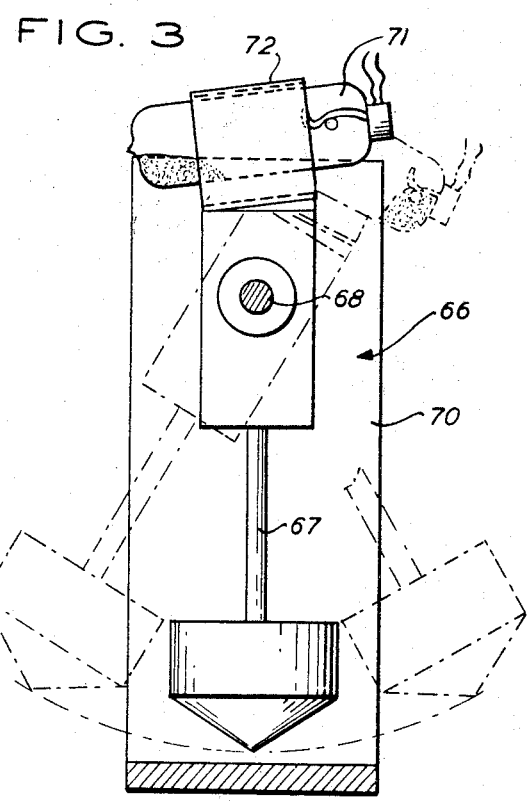
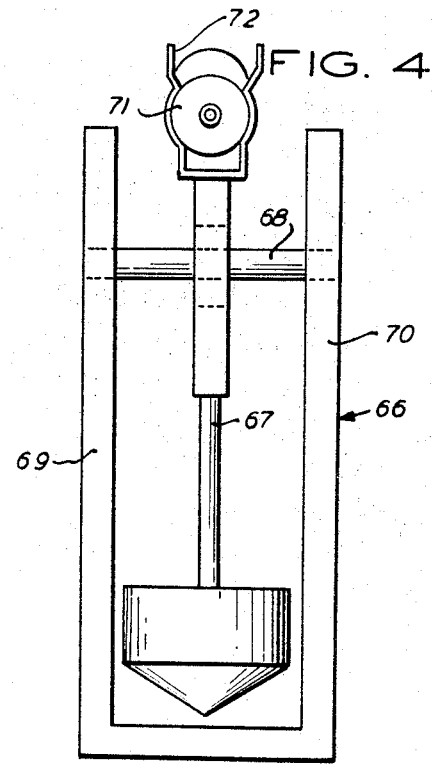

July 4, 1967  F. DA SILVA VALERIO  3,329,312
RECORDER ACTUATED FLUID DELIVERY SYSTEM
Filed Sept. 30, 1966  5 Sheets-Sheet 5
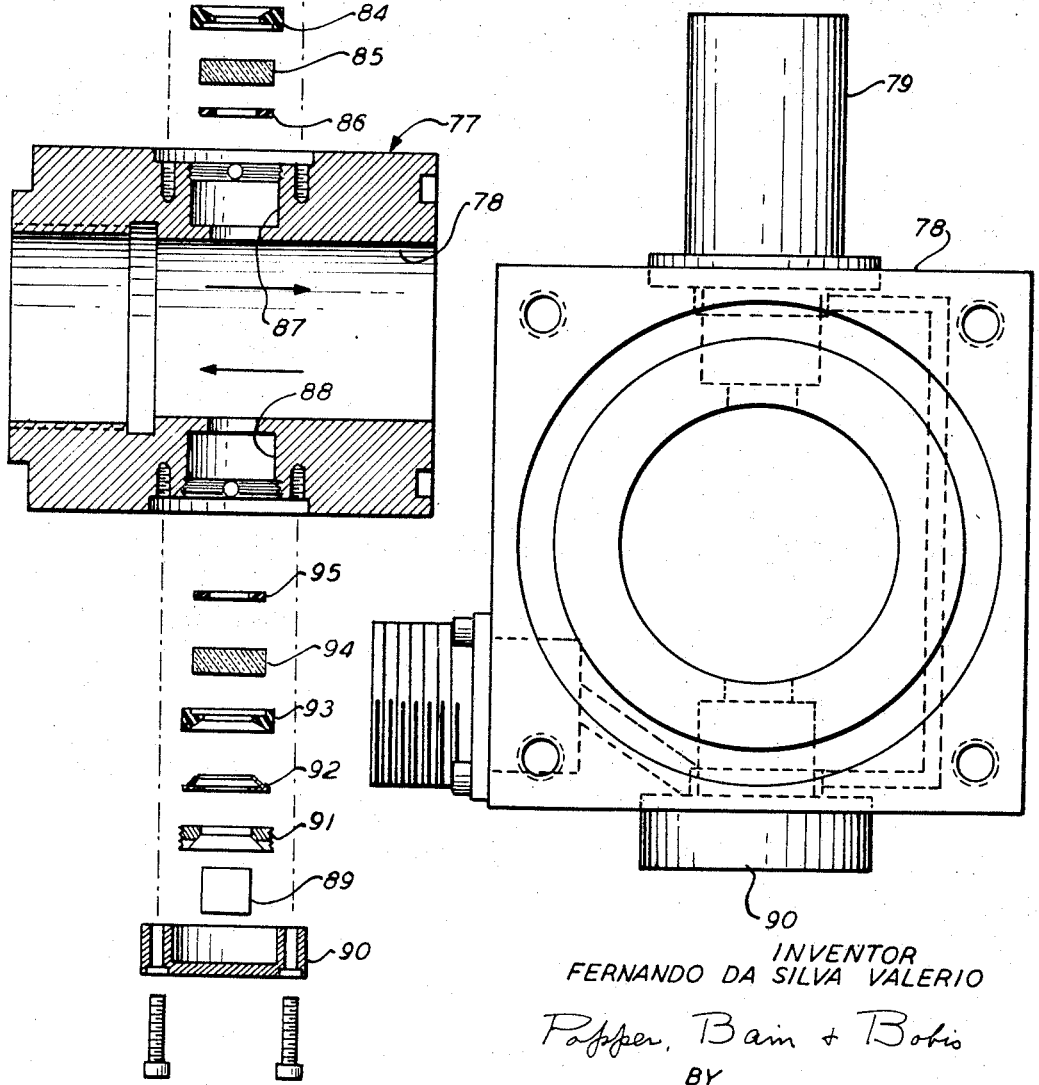
INVENTOR
FERNANDO DA SILVA VALERIO
Popper, Bain & Bobis
BY
ATTORNEYS

United States Patent Office 3,329,312
Patented July 4, 1967

3,329,312
RECORDER ACTUATED FLUID DELIVERY
SYSTEM
Fernando da Silva Valerio, 31 Grove St.,
Kearny, N.J. 07032
Filed Sept. 30, 1966, Ser. No. 583,315
11 Claims. (Cl. 222—30)

My invention relates to fluid flow systems generally and specifically to a recorder actuated fluid delivery system. This application is a continuation-in-part of my co-pending United States patent application, Ser. No. 499,920 filed on Oct. 21, 1965, for an Actuated Recorder.

In my co-pending application, I disclosed and claimed an actuated recorder for fluid delivery systems in which a delivery ticket is imprinted with a gallonage reading at the beginning and at the end of delivery, the difference therebetween being the number of gallons delivered. The operator causes the final imprint to be made by actuating a push-button switch. However, in the event that by accident or by deliberation, the operator fails to generate a read out of the final gallonage on the delivery ticket, any attempt to engage the gears of the delivery truck automatically generates a final read out on the ticket. This system thereby prevents either accidental or deliberate failure to record the gallonage at termination of delivery and diversion of fluid to a second delivery point, the final gallonage being read out only after termination of fluid flow after second delivery.

Since engaging the gears of the delivery truck transmission automatically generates a final read out, the difficulties inherent in known systems wherein interlocks prevent the starting of truck engine or release of brakes are avoided altogether.

In my present invention, I employ a similar recorder actuated fluid delivery system in which limited movement of the delivery truck for a predetermined relatively short period of time is permitted without causing an automatic final read out of gallonage. In addition, air detection means are operatively connected to the control system whereby if air is infused into the fluid in the delivery line, the main delivery valve immediately closes and cannot be reopened until the air infusion has been eliminated; and a final read out is generated if the air infusion is not eliminated within a predetermined period of time.

In my co-pending patent application aforesaid, I disclosed and claimed a printing head which imprinted the initial reading by rotation of the printer head in one direction and the terminal reading by rotation of the same printer head in the opposite direction. In my present application, I disclose a printer head which makes both the initial and terminal imprint by rotation thereof in the same direction. However, it must be borne in mind that the direction of rotation of the particular printer head employed is not in and of itself a part of my present invention.

Therefore, it is among the objects and advantages of my invention to provide a recorder actuated fluid delivery system in which a delivery ticket must be properly inserted in the recorder printing head for receipt of an initial gallonage imprint in order to open the main fluid delivery valve.

Another object of my invention is to provide a recorder actuated fluid delivery system having either visual or auditory means to indicate to the operator that the delivery ticket has been improperly inserted in the recorder printing head.

Yet another object of my invention is to provide a recorder actuated fluid delivery system in which movement of the delivery vehicle for a predetermined period of time after initiation of fluid flow and initial gallonage imprint, will automatically terminate fluid flow and generate a terminal imprint on the delivery ticket thereby permitting limited movement of the delivery vehicle for emergency purpose but preventing multiple deliveries on the same ticket at relatively distant locations.

Still a further object of my invention is to provide a recorder actuated fluid delivery system in which the delivery ticket inserted in the recorder head must be withdrawn therefrom after terminal imprint before the system can be again conditioned for fluid delivery.

A further object of my invention is to provide a recorder actuated fluid delivery system having visual means to indicate the status of the system at any given time prior to, during and after delivery.

Yet a further object of my invention is to provide a recorder actuated fluid delivery system having a counter operatively connected thereto which records the number of fluid flow initiations and terminations and thus, the number of individual deliveries.

Still a further object of my invention is to provide a recorder actuated fluid delivery system in which a gravity responsive, inertial switch detects movement of the delivery vehicle, and sets in motion means for terminating fluid flow permanently and generating a final gallonage read out on the delivery ticket after a given predetermined period of time.

Yet still another object of my invention is to provide a recorder actuated fluid delivery system having means to detect the infusion of air in the fluid delivery line operatively connected to the system to terminate fluid delivery and generate a terminal read out of the recorder after a given period of time.

These objects and advantages as well as other objects and advantages may be achieved by my invention one embodiment of which is illustrated in the drawings which:

FIGURES 1a and 1b are a mated schematic wiring diagram of my recorder actuated fluid delivery system;

FIGURE 3 is a side elevational, partially broken away view of my inertial switch;

FIGURE 4 is an end elevational view of the inertial switch shown in FIGURE 3;

FIGURE 5 is a side elevational, exploded view of my air detector assembly;

FIGURE 6 is an end elevational view of the air detector shown in FIGURE 5 where the wire passages are shown in broken lines;

FIGURE 7a and 7b is a schematic view of the hydraulic control system for the main delivery valve;

Figure 2:
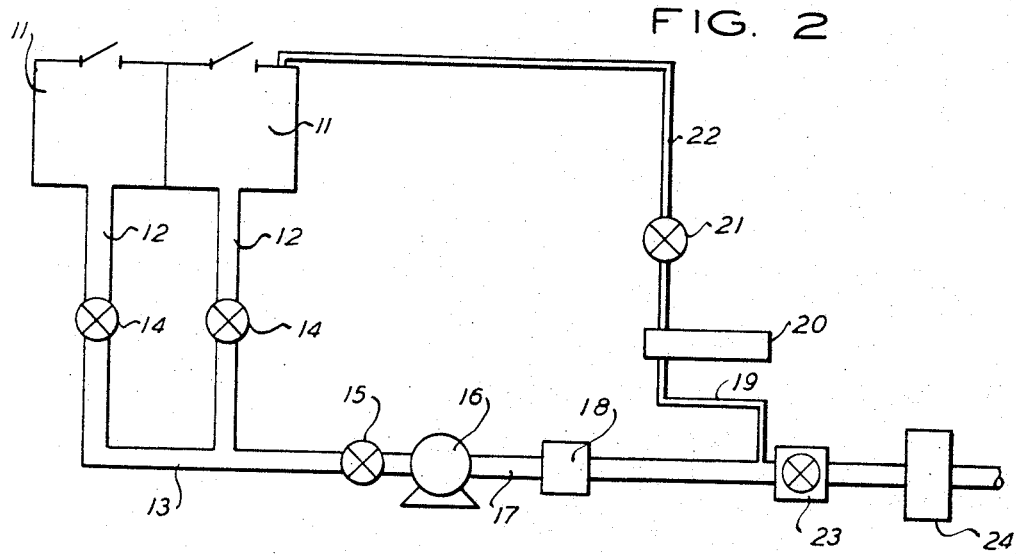
FIGURE 2 is a schematic illustration of the various elements in my said system.
Figure 8:
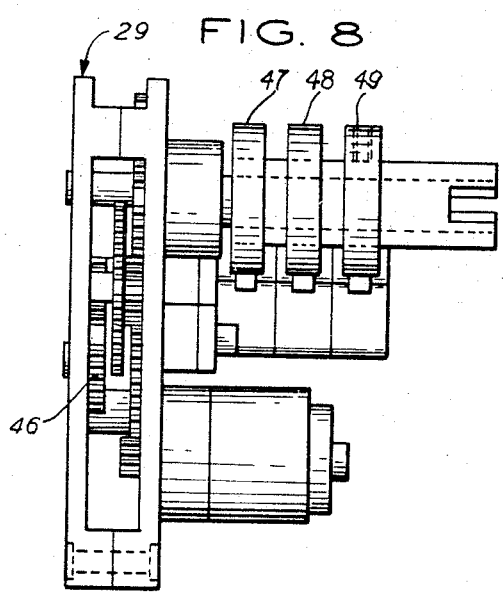
FIGURE 8 is an end elevational view of the motor driven transmission which controls rotation of the recorder imprinting head.
Figure 9:
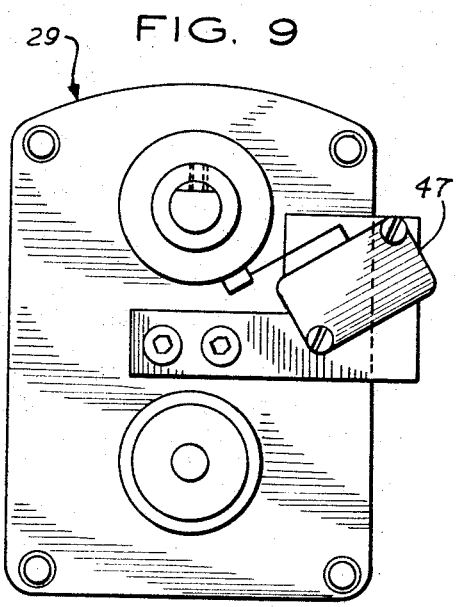
FIGURE 9 is a side elevational view of the transmission control shown in FIGURE 8.

Referring now to the drawings in detail, the constituent parts of the recorder actuated fluid control system are schematically illustrated in FIGURE 2. A plurality of tanks 11, 11 are mounted on some movable vehicle not illustrated herein. A conduit 12, 12 connects to and extends from the bottom of each tank downwardly to a generally horizontal manifold conduit 13. For convenience each of the conduits 12, 12 may be provided with a valve 14, 14 intermediate its ends which is manually operated. The manifold is also provided with a manually operated valve 15 in general proximity to a pump 16. The high pressure outlet 17 of the pump 16 connects to an air detector 18. The air detector 18 is in turn connected through conduit 19 to a hydraulic actuator 20. The opposite side of the actuator 20 is connected to a normally opened valve 21 in a conduit 22 leading back to the tanks 11, 11.

The outlet side of the air detector 18 is connected to a main control valve 23 on the downstream side conduit 19. The valve 23 is controlled by the actuator 20 as illustrated schematically in FIGURES 7a and 7b. The outlet side of control valve 23 is connected to a totalizing flow meter 24 which is in turn operatively connected to an imprinting recorder.

Referring now to the schematic diagram illustrated in FIGURES 7a and 7b, my hydraulic actuator 20 comprises a housing 102 connected on one side thereof to conduit 19 and on the opposite side to conduit 22 and valve 21. Valve 21 is on the downstream side of the actuator 20. A piston 25 is slidably mounted within the housing 102 and is normally urged by spring 26 to the position shown in FIGURE 7a. In this position, fluid coming into the housing 102 from conduit 19 passes therethrough and outwardly to valve 21 which, if it is open, admits fluid to conduit 22 back to tank 11. However, if valve 21 is closed, fluid flowing into the housing 102 from conduit 19 is trapped increasing the internal pressure therein and forcing the piston 25 to compress spring 26. When the piston 25 has moved to expose conduit 27 connected to the housing 102 normally to the rear of piston 25, fluid pressure is released through conduit 27. Conduit 27 is connected to the main control valve 23 and, when there is sufficient pressure in conduit 27, valve 23 opens. Conduit 28 is provided merely for the release of fluid trapped within housing 102 behind the piston 25. Thus, valve 21 in turn controls the hydraulic actuator 20. Valve 21 is in turn controlled by electrical signals from my control circuit.

Although I have illustrated one type of hydraulically controlled main supply valve 23, obviously, any valve control system is appropriate so long as it is operated from a signal derived from my control circuit.

Referring now to the circuit diagram shown in FIGURE 1, main supply valve 23 is normally closed when the entire electrical control system is shut down or otherwise inoperative. The control valve 21 must receive a signal from my control system in order to cause the main supply valve 23 to open.

In order to initiate fluid delivery by opening the main supply valve 23, the following steps must be undertaken:

A delivery ticket must be inserted into the printing head of the totalizing flow meter 24. The printing head as disclosed in this application includes a rotatable mechanism which generates a gallonage imprint on a ticket. After initial imprint, the mechanism rotates 360 degrees to imprint the terminal reading after the delivery has been completed. However, there are many different types of printing heads most of which rotate in the same direction to imprint both the initial and terminal reading but some of which rotate in an opposite direction to generate the initial and terminal readings. The particular printing head is not part of my invention per se and my system as disclosed and claimed herein may be adapted to function with any type of printing head.

The printing head has associated therewith an electrically driven and controlled transmission 29. The printing head contains a mechanically actuated electrical contact switch 30 having three contacts, 31, 32 and 33. Unless the delivery ticket is properly inserted into the printing head, the switch 30 will not be properly actuated and my system will remain inoperative as hereinafter described.

Under normal conditions, the delivery ticket is inserted in the printing head, and the operator depresses momentary push-button switch 34 to actuate my system generally.

However, if the operator has either failed to insert or has improperly inserted delivery ticket in the printing head, depressing the switch 34 will not energize the printing head nor open the main supply valve 23 but rather will cause a warning light to blink. The circuitry to the warning light is as follows: Contacts 31 and 32 of printing head switch 30 are normally closed when no delivery ticket is either in the printing head or is improperly inserted into the printing head. The positive terminal of battery 35 is connected through relay 36 and one terminal of push-button switch 34 to contact 32 of printing head switch 30. This in turn connects one side of relay 37 to the battery 35. It should be noted that battery 35 is isolated from the entire circuit by breaker 38. When the push-button 34 is depressed, current passes therefrom to and through relay 39 to the hot side of the solenoid of relay 37 thereby energizing relay 37. Relay 37 remains interlocked until contacts 31 and 32 are broken by the proper insertion of a delivery ticket in the printing head to engage switch 30. Power now flows through relay 37 to a blinking relay 40 which in turn is connected to a pair of resistors 41 and 42. Resistor 41 is a load resistor accelerating the blinking sequence of lamp 43 connected in series to the protective resistor 42.

Thus, when the ticket is not inserted in the printing head or has been improperly inserted therein and the push-button 34 depressed to actuate my system, lamp 43 blinks to warn the operator and the main supply valve 23 remains closed.

If the delivery ticket has been properly inserted in the printing head, normally closed contacts 31 and 32 break and normally open contacts 32 and 33 engage. Upon the breaking of contacts 31 and 32, relay 37 drops off and the blinking lamp 43 is deenergized.

When the momentary push-button switch 34 is depressed, power now passes threthrough and through contacts 32 and 33 of the printing head switch 30. Relay 39 was energized when the contacts of switch 30 were closed, now relay 36 is energized through relay 44 and a cam operated switch system hereafter described. Energizing relay 36 in turn energizes a DC motor 45 adapted to drive a gear train 46 of transmission 29 which in turn rotates the shaft of the printing head. In addition, energizing motor 45 causes simultaneous rotation of three control cams 47, 48 and 49 each connected to the output drive shaft of the gear train 46.

Cam 47 closes normally opened microswitch 50 through a cam rider 51. A relatively small angular movement of cam 47 closes normally open microswitch 50. Closing microswitch 50 results in an interlock of relay 36 which remains interlocked during the remainder of 360° of rotation of cam 47.

After approximately two degrees of rotation of cam 47 and after normally open microswitch 50 has closed to interlock relay 36, normally closed contacts 52 and 53 of microswitch 54 break under the influence of cam 48 through cam rider 55. Simultaneously contacts 53 and 56 of microswitch 54 close feeding power to the hot side of the holding solenoid of relay 44 interlocking the same.

The motor 45 has permanent magnet inductors and, in order to arrest the rotation of its armature at an exact point, relay 36 has been grounded. Thus, when relay 36 drops off, the armature of the motor 45 is short circuited back through relay 36 to ground. It should also be noted that the interlock of relay 36 is provided with a diode 57 which prevents the feed back of positive polarity to a negative ground from terminal 58 of the interlock in relay 36 through microswitch 50. The negative feedback referred to above occurs when, because of accidental improper positioning of cam 47, microswitch 50 is closed when relay 36 drops off at the end of the cycle. This can occur if the cam angle of cam 47 is extremely great or if there is some movement of cam 47 due to mechanical forces emanating from the gear train 46 of transmission 29. Thus, should microswitch 50 be closed when relay 36 drops off, a negative ground would be present at terminal 58 in relay 36. The diode 57 prevents this negative ground and the backfeeding of current thereto as set forth above.

It should also be noted that when relay 44 closes to energize the control valve 21, lamp 60 interconnected thereto is energized and indicates that delivery of fluid is in process.

Relay 44 is also interconnected to the counter 61 which advances one step as relay 36 energizes and then deenergizes during initial imprint. During the second or terminal imprint, no differential in potential occurs across the counter 61 and hence, the counter 61 will not advance.

At this juncture, the operator delivers the amount of fluid desired and is ready to terminate delivery and cause a second imprint on the delivery ticket. In order to cause a second imprint on the delivery ticket, the operator depresses momentary push-button switch 62 which causes current to pass from relay 44 through microswitch 63 controlled by cam 49 through the push button switch 62, through relay 39 and relay 64 and the normally open side of relay 44 and microswitch 54 to relay 36 controlling motor 45. From here insofar as the motor 45 is concerned, the cams 47 and 48 and the relay 36 operate in a fashion identical to the first imprinting.

When the coil of relay 59 is energized interlocking the same, the signal to control valve 21 is cut off hence, actuating actuator 20 to close main supply valve 23 so that no more fluid may pass from tanks 11. Power from relay 44 constantly feeds the interlock of relay 59. Energizing relay 59 energizes time delay relay 65. Time delay relay 65 is adjusted so that its contacts will close in two seconds which in turn energizes relay 64. Relay 64 becomes interlocked by current from relay 44. Energizing relay 64 effectively removes momentary push-button switch 62 from the circuit rendering its further manipulation ineffective. Cam 47 rotates until microswitch 50 opens. Relays 44, 64, 39 and 59 remain energized until the switch 30 in the printing head is actuated by removal of the ticket thereby opening contacts 32 and 33.

Cam 49 operates only to prevent the lockout of the second imprint on the delivery ticket should the operator decide to depress momentary push button switch 62 while the first imprint is being applied. Cam 49 with its switch 63 permits the closure of the circuit through momentary push-button switch 62 only when the electrical system is at rest during delivery. It can also be seen that during the second imprint on the delivery ticket, the circuits to both push-buttons 34 and 62 are inoperative.

At this point, the second imprint has been made on the delivery ticket, the delivery ticket has been withdrawn from the printing head and the operator is in a position to move his vehicle to the next point of delivery. There is some controversy in the industry as to the best device to protect against the operator's leaving the ticket in the printing head, failing to cause the second imprint and moving the vehicle to the next point and recommencing another delivery without putting a new ticket in the printing head. Some believe that the second imprint should be automatically placed on the ticket should the operator attempt to move the vehicle in any fashion as for instance energizing the ignition, releasing the brakes, engaging the transmission or the like. However, frequently an operator is confronted with an emergency situation in which he must momentarily interrupt delivery at one location to move his truck for emergency vehicles, let some person blocked thereby get his car from a parking spot or the like. If the system were so constructed that a second imprint would be imperative upon the moving of the vehicle, two delivery ticket would be used for one delivery. I have provided means for the driver to momentarily move the vehicle without causing a second imprint so long as the delivery of fluid recommences within a given period of time too short to permit the vehicle to be removed to anything but a very, very near second delivery point.

In order to accomplish this end, I have provided a gravity sensitive inertial switch illustrated in detail in FIGURES 3 and 4.

The inertial switch comprises a generally U-shaped rigid mounting member 66 which is attached to any stable portion of the delivery vehicle. A pendulum 67 is mounted on a shaft 68 extending between legs 69 and 70 of the mounting member 66 so that the pendulum 67 may swing freely in a plane parallel to the plane of the legs 69 and 70, upon forward or rearward motion of the switch.

A mercury switch 71 is mounted in a resilient clip 72 on top of the pendulum 67. The clip 72 is oriented at an angle to the vertical axis of the mounting member 66 so that the mercury tends to remain away from the closed contact position. This positioning of the mercury switch 71 permits the vehicle to be parked on an incline either in the forward or rearward position without accidentally causing the mercury switch to close. However, any movement of the truck will cause the pendulum to swing under the influence of inertia and such swinging causes the mercury to slush forwardly and rearwardly in the switch 71 causing the switch to at least momentarily close.

Referring now to FIGURE 1 in detail, movement of the vehicle will cause mercury switch 71 to momentarily close as aforesaid. Closing of the contacts in switch 71 permits current from the hot side of the holding solenoid of relay 44 to pass through the normally closed side of relay 64 to relay 73. Hence, since relay 73 has been energized by the momentary closing of mercury switch 71 it becomes interlocked by the current flowing from relay 64. Relay 73 in turn feeds delay relay 74. Delay relay 74 prevents activation of the terminal imprint for a predetermined period of time whereupon delay relay 74 closes. The next time mercury switch 71 closes due to motion of the vehicle, current passes through delay relay 74 and from thence, to relay 39 and thereafter proceeds in a manner identical to the normal procedure when momentary push button switch 62 is depressed to cause the second imprint on the ticket.

I have also provided a toggle switch 75 to by pass the delay relay 74. When switch 75 is engaged, momentary closure of mercury switch 71 permits current to flow therethrough directly to relay 39 and hence, generates a terminal read-out. Such a by pass switch 75 is required in some states in which the Bureau of Weights and Measures requires that an imprint be made immediately upon any movement of the truck.

A diode 76 is provided between the hot side of holding solenoid of relay 73 and one terminal of the mercury switch 71 which is normally positively biased. When mercury switch 71 first closes, time delay relay 74 is energized but no readout occurs because relay 74 is still open. After a predetermined period of time, relay 74 closes. Now, if mercury 71 again closes, current will pass through relay 74 to generate a second readout.

Another difficulty encountered during fluid delivery is that of air infusion. Air may be infused when one tank becomes empty and fluid is drawn from an adjacent tank without first closing the valves to the empty tank. Under more perfidious conditions, the driver of the delivery vehicle may simply take an open pipe and drop it down through the tank from which fluid is being delivered into the delivery pipe at the bottom of the tank thereby causing air infusion by aspiration.

Existing air eliminators are insufficient to detect infused air under perhaps as much as 25% air and 75% fluid.

My delivery system includes an air infusion detector employing the principles of photoelectric conductivity of light passing through the stream of fluid emanating from the pump but before passing through the meter.

My particular air detector is illustrated in detail in FIGURES 5 and 6. A housing 77 is provided with a transverse passage 78 through which fluid passes. Mounted on the housing 77 is a light enclosure 79 which is secured to the housing by bolts 80, 80. A lamp 81 is seated in the enclosure 79 by means of a compression nut 82 a compression washer 83 and a compression gasket 84. A lens 85 is also positioned in front of the lamp 81 by means of a gasket 86. A second passage 87 generally axial with the housing 79 communicates with the transverse passage 78 in the housing 77.

Opposite the passage 87 and generally axial therewith is a second passage 88 over which there is mounted, a photocell 89. The photocell is mounted by means of a cover 90, a compression nut 91, a compression washer 92 and a compression gasket 93. As in the case of the lamp 81, the photocell 89 is also provided with a lens 94 secured in place by washer gasket 95.

In operation, fluid passing through passage 78 is altered in its light transmission characteristics by the infusion of air. This variation in light transmission from lamp 81 is detected by the photocell 89. Generally, the greater the amount of air infused within the fluid stream, the greater the resistance of the photocell. When the resistance reaches a predetermined maximum, relay 96 is energized thereby opening valve 21. Opening of valve 21 actuates actuator 20 to close main supply valve 23 with the result that fluid now recirculates back to the tanks 11, 11. After relay 96 is energized, delay relay 97 begins to toll the time from which air has initially been detected. After a predetermined length of time, delay relay 97 will set in motion the proper circuit for permanently shutting down main supply valve 23 and causing a terminal imprint to be made by the printing head. A lamp 98 is provided either in the cab of the vehicle or in some other convenient place to warn the operator of the infusion of air when my air detector system becomes energized because of excess air entrainment. A potentiometer 99 is included in the circuit to the photocell 89 to adjust for base or non-air infusion conditions found for particular liquids as for instance, cloudiness, liquid color and the like. Thus, polarity can be altered to provide a wide range of usefulness for my system.

As the conductivity of photocell 89 decreases, collector current increases to a predetermined point whereupon relay 96 will energize shutting down the main supply valve 23. Normally closed relay 100 is provided to detect the total absence of fluid which increases the conductivity of photocell 89 beyond a predetermined point. Potentiometer 101 is employed to adjust the sensitivity of relay 100.

Thus, after air infusion is first detected and the operator is given a visual signal, he has approximately three minutes to correct the situation otherwise final imprint will occur. Obviously, delay relay 97 may be adjusted to increase or contract the period of time in which the operator has to correct the air infusion. However, at no time will air and fluid mixtures be passed into and through the main delivery valve 23.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. A recorder actuated fluid delivery system comprising,
    (a) a tank,
    (b) a discharge conduit connected to the tank,
    (c) a normally closed valve in the discharge conduit, the valve opening and closing in response to signals in circuit means operatively connected thereto,
    (d) a totalizing flow meter operatively connected to the conduit on the down-stream side of the valve,
    (e) a recorder operatively connected to the flow meter having an imprinting mechanism adapted to receive a card,
    (f) the imprinting mechanism generating a first and a second imprint on said card each in response to a signal in circuit means operatively connected thereto,
    (g) manually actuated means for generating a signal to open the valve and substantially simultaneously generate a first imprint on the card,
    (h) manually actuated means for generating a signal to close the valve and substantially simultaneously generate a second imprint on the card and,
    (i) means responsive to movement of the system for automatically generating signals to close the valve and generate a second imprint on the card.

2. A recorder actuated fluid delivery system comprising,
    (a) the structure in accordance with claim 1 and,
    (b) air detection means positioned for sampling fluid passing through the discharge conduit on the upstream side of the valve,
    (c) the air detection means generating the signal through circuit means to close the valve immediately upon the detection of air in the fluid in excess of a predetermined level and thereafter the signal to generate a second imprint on the card.

3. A recorder actuated fluid delivery system comprising,
    (a) the structure in accordance with claim 1 in which the said means responsive to movement of the system are,
    (b) a pendulum pivotally mounted to the system, the pivot plane of the pendulum being generally parallel to the normally expected axis of movement of the system, and
    (c) switch means operatively connected to the pendulum and actuated by movement thereof to generate the said signals.

4. A recorder actuated fluid delivery system comprising,
    (a) the structure in accordance with claim 2 in which, the said air detection means are,
    (b) a light source incident upon the fluid,
    (c) a photo-electric cell in light interrupting relationship to light emanating from said source and passing through a representative sample of said fluid,
    (d) the conductivity of said photo-electric being responsive to the concentration of air in the fluid sample,
    (e) the photo-cell generating the signal to close the valve and generate the second imprint through circuit means when the said conductivity changes to a predetermined, sufficient degree.

5. A recorder actuated fluid delivery system comprising,
    (a) the structure in accordance with claim 1, and
    (b) circuit delay means for delaying for a predetermined time the generation of signals to close the valve and generate a second imprint on the card in response to movement of the system, the said delay means permitting the generation of said signals only upon movement of the system subsequent to the delay period.

6. A recorder actuated fluid delivery system comprising,
    (a) the structure in accordance with claim 2 and,
    (b) circuit delay means actuated by the air detection means for delaying the generation of the second imprint for a predetermined period of time, the second imprint being generated only if excessive air is again detected after the delay period.

7. A recorder actuated fluid delivery system comprising,
    (a) the structure in accordance with claim 6 and,
    (b) circuit means for reopening the valve without generating a second imprint on the card after the delay period if excessive quantities of air are not then detected by the air detection means.

8. A recorder actuated fluid delivery system comprising,
   (a) the structure in accordance with claim 2 and,
   (b) counter means actuated once through circuit means for each pair of imprints on the card.

9. A recorder actuated fluid delivery system comprising,
   (a) the structure in accordance with claim 1 and,
   (b) means in the imprinting mechanism responsive to the card which prevents opening of the valve and generation of a first imprint unless the card is properly positioned to receive a first imprint.

10. A recorder actuated fluid delivery system comprising,
    (a) the structure in accordance with claim 2 and,
    (b) means in the imprinting mechanism responsive to the card which prevents opening of the valve and generation of a first imprint unless the card is properly positioned to receive a first imprint.

11. A recorder actuated fluid delivery system comprising,
    (a) a tank,
    (b) a discharge conduit connected to the tank,
    (c) a normally closed valve in the discharge conduit, the valve opening and closing in response to signals in circuit means operatively connected thereto,
    (d) a totalizing flow meter operatively connected to the conduit on the down-stream side of the valve,
    (e) a recorder operatively connected to the flow meter having an imprinting mechanism adapted to receive a card,
    (f) the imprinting mechanism generating a first and a second imprint each in response to a signal in circuit means operatively connected thereto,
    (g) manually actuated means for generating a signal to open the valve and substantially simultaneously generate a first imprint on the card and,
    (h) manually actuated means for generating a signal to close the valve and substantially simultaneously generate a second imprint on the card.

References Cited

UNITED STATES PATENTS

| | | | |
|---|---|---|---|
| 1,206,507 | 11/1916 | Bradley | 222—30 X |
| 3,092,289 | 6/1963 | Renlschler | 222—30 |

ROBERT B. REEVES, *Primary Examiner.*

HADD S. LANE, *Assistant Examiner.*